United States Patent [19]
Gustafson

[11] Patent Number: 6,014,601
[45] Date of Patent: Jan. 11, 2000

[54] DRIVER ALERT SYSTEM

[75] Inventor: J. Martin Gustafson, 100 Watson Dr., Yale, Okla. 74085

[73] Assignee: J. Martin Gustafson

[21] Appl. No.: 08/779,793

[22] Filed: Jan. 7, 1997

[51] Int. Cl.[7] .............................. G08G 1/16; B60Q 1/00
[52] U.S. Cl. .......................... 701/45; 701/301; 340/436
[58] Field of Search ................................ 701/45, 301, 96; 340/425.5, 435, 436, 438; 342/70, 71, 72

[56] References Cited

U.S. PATENT DOCUMENTS

| | | | |
|---|---|---|---|
| 3,984,836 | 10/1976 | Oishi et al. | 343/13 R |
| 4,003,049 | 1/1977 | Sterzer et al. | 343/6 R |
| 4,072,945 | 2/1978 | Katsumata et al. | 343/7 |
| 5,233,524 | 8/1993 | Jackson | 364/424.01 |
| 5,249,157 | 9/1993 | Taylor | 340/903 |
| 5,278,764 | 1/1994 | Iizuka et al. | 364/461 |
| 5,314,037 | 5/1994 | Shaw et al. | 180/169 |
| 5,357,438 | 10/1994 | Davidian | 364/461 |
| 5,388,048 | 2/1995 | Yavnayi et al. | 364/461 |
| 5,410,484 | 4/1995 | Kunimi et al. | 364/426.01 |
| 5,436,835 | 7/1995 | Emry | 364/426.01 |
| 5,529,138 | 6/1996 | Shaw et al. | 180/169 |
| 5,629,669 | 5/1997 | Asano et al. | 340/436 |

*Primary Examiner*—Michael J. Zanelli

[57] ABSTRACT

A laser transmitter is configured to transmit a laser beam at an object, and a laser receiver is configured to receive a reflection of the laser beam. A speed sensor is connected to a vehicle speedometer system and receives vehicle speed information from the vehicle speedometer system. A processing unit receives laser pulse data from the laser receiver and road condition data from a road condition switch, and the vehicle speed information from the speed sensor. The processing unit calculates a relative speed of the object with respect to the vehicle, a distance from the object to the vehicle, and a relative acceleration of the object with respect to the vehicle. The processing unit further calculates a safe following distance based on the road condition data and the vehicle speed information, and compares the safe following distance to the actual distance from the object to the vehicle. The processing unit further calculates a collision time based on the relative speed of the object, the distance from the object to the vehicle, and the relative acceleration of the object. The collision time is displayed on a collision time display. A linear light display indicates the relative level of safety or danger based on following distance and collision time.

9 Claims, 4 Drawing Sheets

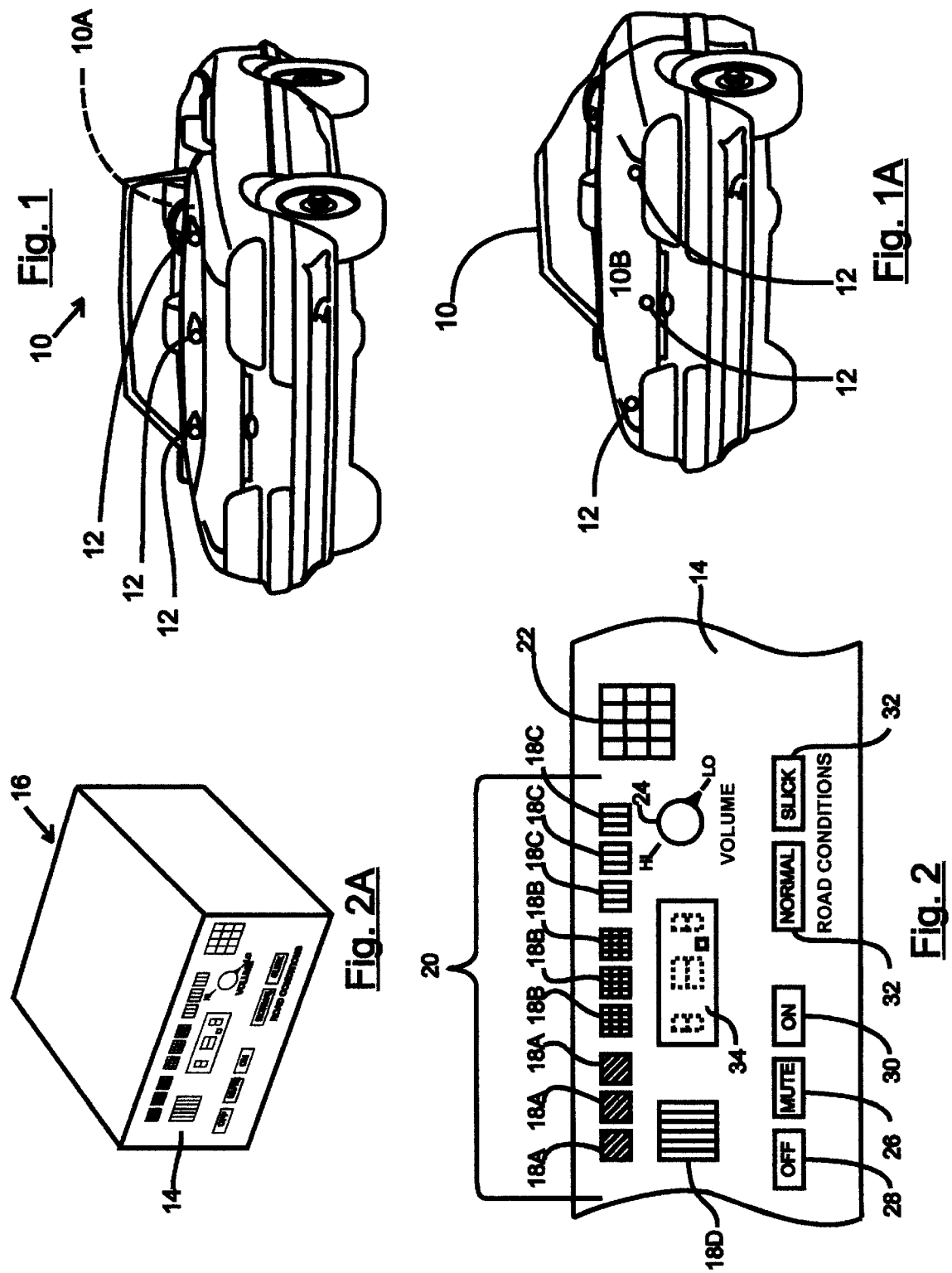

DRIVER ALERT SYSTEM

BACKGROUND OF THE INVENTION

1. Field of the Invention

The present invention relates to detectors, specifically to a detector for use in a vehicle for measuring the relative speed and distance of objects in the path of travel of the vehicle.

2. Description of the Related Art

As the world's population continues to grow, more and more traffic congestion occurs on roadways, particularly in urban areas. With more cars on the road, it becomes more difficult for an individual driver to avoid a collision, particularly when following other vehicles too closely.

In the prior art, efforts have been made to increase the safety of a driver by providing devices for installation in or on a vehicle, which measure the distance to an object in front of the vehicle, and which also measure the closing speed of the object relative to the vehicle. Such devices may be used to warn a driver when the distance between his vehicle and the vehicle in front of him is closing quickly, making a collision likely if corrective action is not implemented.

Devices intended for use in vehicles, which measure distance, speed or both for the purposes stated herein-above, are known in the prior art. U.S. Pat. No. 3,984,836 to Oishi et al. discloses a device which measures the distance to an object in a vehicle's path using microwave radar technology. Microwave pulses are transmitted from a transmitting antenna in a direction forward of the vehicle on which the antenna is mounted. The microwaves are reflected off of the object, then received by a microwave receiver. The device calculates the distance from the vehicle to the object based on the time delay between the transmission and the reception of the microwave pulses. The distance is displayed in a relative fashion on a light display next to the vehicle's speedometer.

U.S. Pat. No. 4,003,049 to Sterzer et al. discloses a system using frequency-modulated continuous-wave radar to determine the distance to an object in a vehicle's path. The system uses transmitting and receiving antennas, and computes distance by measuring the frequency shift between the transmitted and the received signals. No particular audible or visual system for providing the distance information to the driver is disclosed.

U.S. Pat. No. 4,072,945 to Katsumata et al. disloses a radar-operated collision avoidance system which measures both distance from a vehicle to an object in the vehicle's path, and relative speed of the object. The system utilizes these measured quantities, as well as other conditions such as human factors, road and weather conditions to determine whether the vehicle is approaching the object at an unsafe speed. No particular audible or visual system for providing the distance information to the driver is disclosed.

U.S. Pat. No. 5,314,037 to Shaw et al. discloses a system using lasers to determine the distance to an object in a vehicle's path, and the speed of the object relative to the vehicle. The system divides the speed into the distance to calculate a time period until collision. The system also calculates a plurality of minimum allowable times to establish various safety levels. For example, a disastrous level minimal allowable time would be shorter than a critical level minimal allowable time, which would be shorter than a warning level minimal allowable time. Each level can be associated with a different degree of audible or visual alarm. No specific embodiments of audible or visual alarm are disclosed.

SUMMARY OF THE INVENTION

The driver alert system of the present invention includes a laser transmitter configured to transmit a laser beam at an object, and a laser receiver configured to receive a reflection of the laser beam. A speed sensor is connected to a vehicle speedometer system and receives vehicle speed information from the vehicle speedometer system. A processing unit receives laser pulse data from the laser receiver, road condition data from a road condition switch, and the vehicle speed information from the speed sensor. The processing unit calculates a relative speed of the object with respect to the vehicle, a distance from the object to the vehicle, and a relative acceleration of the object with respect to the vehicle. The processing unit further calculates a safe following distance based on the road condition data and the vehicle speed information, and compares the safe following distance to the actual distance from the object to the vehicle. The processing unit further calculates a collision time based on the relative speed of the object, the distance from the object to the vehicle, and the relative acceleration of the object. The collision time is displayed on a collision time display. A linear light display indicates the relative level of safety or danger based on following distance and collision time.

Accordingly, several objects and advantages of the present invention are:

a. to provide a speed and distance indicator which informs a driver when he or she is following another vehicle too closely for safety;

b. to provide a speed and distance indicator for a vehicle which informs a driver when he or she is approaching an object too quickly for safety;

c. to provide a speed and distance indicator for a vehicle which factors in relative change in speed when determining whether a driver is approaching an object too quickly for safety;

d. to provide a speed and distance indicator which provides a linear light display to indicate the relative level of safety or danger of approach;

e. to provide a speed and distance indicator which provides a digital display of the calculated time before collision between the vehicle and the object being approached; and f. to provide a speed and distance indicator which may be used to alert a driver of objects in his or her path under conditions of poor visibility, such as fog, snow or rain.

Still further objects and advantages will become apparent from the ensuing description and drawings.

BRIEF DESCRIPTION OF THE DRAWINGS

FIG. 1 is a perspective view of a vehicle incorporating the driver alert system.

FIG. 1A is a partial perspective view of the vehicle, showing the transmitter and receiver combinations in an alternate location.

FIG. 2 is a partial front elevational view of a control and output panel.

FIG. 2A is a perspective view of a housing which may incorporate many of the components of the driver alert system.

DETAILED DESCRIPTION

Figure 3:
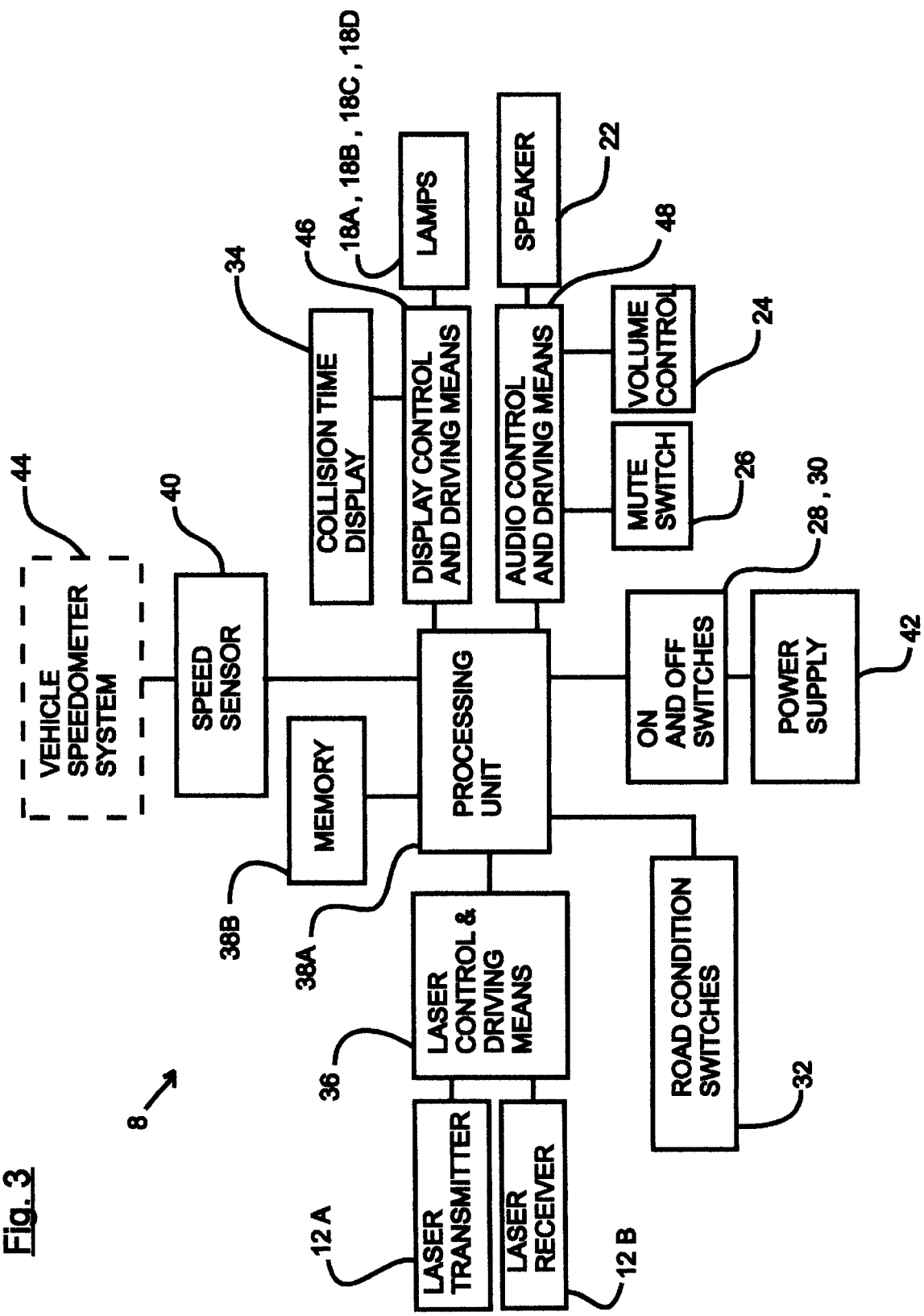
FIG. 3 is a block diagram of the driver alert system.

FIG. 1 is a perspective view of a vehicle 10 with a plurality of transmitter and receiver combinations 12 positioned on the vehicle dash 10A, and arranged to transmit in a direction forward of the vehicle 10. In the preferred embodiment, the transmitter and receiver combinations 12 are laser transmitters 12A laser receivers 12B (see FIG. 3); however, radar transmitters and receivers may be used. The transmitter and receiver combinations 12 are shown positioned in an equally spaced pattern transversely across the vehicle 10. This is because of the narrow beam width of lasers. The plurality of transmitter and receiver combinations 12 helps to ensure that an object in front of the vehicle 10 will be detected by at least one of the transmitter and receiver combinations 12.

FIG. 1A shows the transmitter and receiver combinations 12 positioned in an alternate location, on the body 10B of the vehicle 10. The transmitter and receiver combinations 12 may be located in any suitable location.

The transmitter and receiver combinations 12 may be manufactured integrally with the vehicle 10, or may be added to the vehicle 10 after manufacture of the vehicle 10.

FIG. 2 is a partial elevational view of a control and output panel 14. The panel 14 may be integral with the vehicle dash 10A, or may be positioned on a face of a housing 16 which contains one or more components of the present invention, as shown in FIG. 2A. A group of three green lamps 18A is positioned on the panel 14, followed by a group of three yellow lamps 18B, followed by a group of three red lamps 18C. The green, yellow and red lamps 18A, 18B, 18C are aligned as a linear display 20.

A red urgent lamp 18D on the panel 14 illuminates to indicate an urgent condition. An audible alarm is provided through the speaker 22 simultaneously with illumination of the urgent lamp 18D to provide additional indication of the urgent condition. A volume control 24 is provided on the panel 14 for adjusting the volume of the audible alarm. The audible alarm may be silenced by pressing a mute switch 26 on the panel 14. An off switch 28 and an on switch 30 are also included on the panel 14 for activating and deactivating the driver alert system 8 (see FIG. 3).

Road condition switches 32 on the panel 14 are used for manually entering the perceived road conditions during use of the driver alert system 8. In the embodiment shown, the conditions may be entered as being "normal" or "slick." The road condition switches 32 may be divided into additional degrees or levels, such as "normal", "slick" and "very slick", for example.

A collision time display 34 on the panel 14 displays a calculated time until collision between the vehicle 10 and an object (not shown) in front of the vehicle 10 and detected by the transmitter and receiver combinations 12. In the embodiment shown, the collision time is shown in seconds on an LED display; however, other embodiments are possible and within the scope of the present invention.

FIG. 3 is a block diagram of the driver alert system 8. The driver alert system 8 may be configured in any method well known in the art, using electronics and micro-electronics technology. A laser control and driving means 36 controls and drives the laser transmitter 12A and the laser receiver 12B. A processing means comprising a processing unit 38A and a memory unit 38B receives data from the laser receiver 12B, from the road condition switches 32, and from a speed sensor 40. The processing unit 38A and the rest of the driver alert system 8 receives power from a power supply 42, which is a battery or other suitable source of power.

The speed sensor 40 is adapted to connect to a vehicle speedometer system 44 and to receive information indicating the speed of the vehicle 10 from the vehicle speedometer system 44, in a conventional manner well known in the art.

A display control and driving means 46 is configured to display the calculated collision time on the collision time display 34, and to control operation of the lamps 18A, 18B, 18C, 18D. An audio control and driving means 48 is configured to drive and control operation of the speaker 22 to emit an audible signal. The display control and driving means 46 and the audio control and driving means 48 control operation of the lamps 18A, 18B, 18C, 18D and the speaker 22 respectively, based on signals received from the processing unit 38A.

Figure 4:
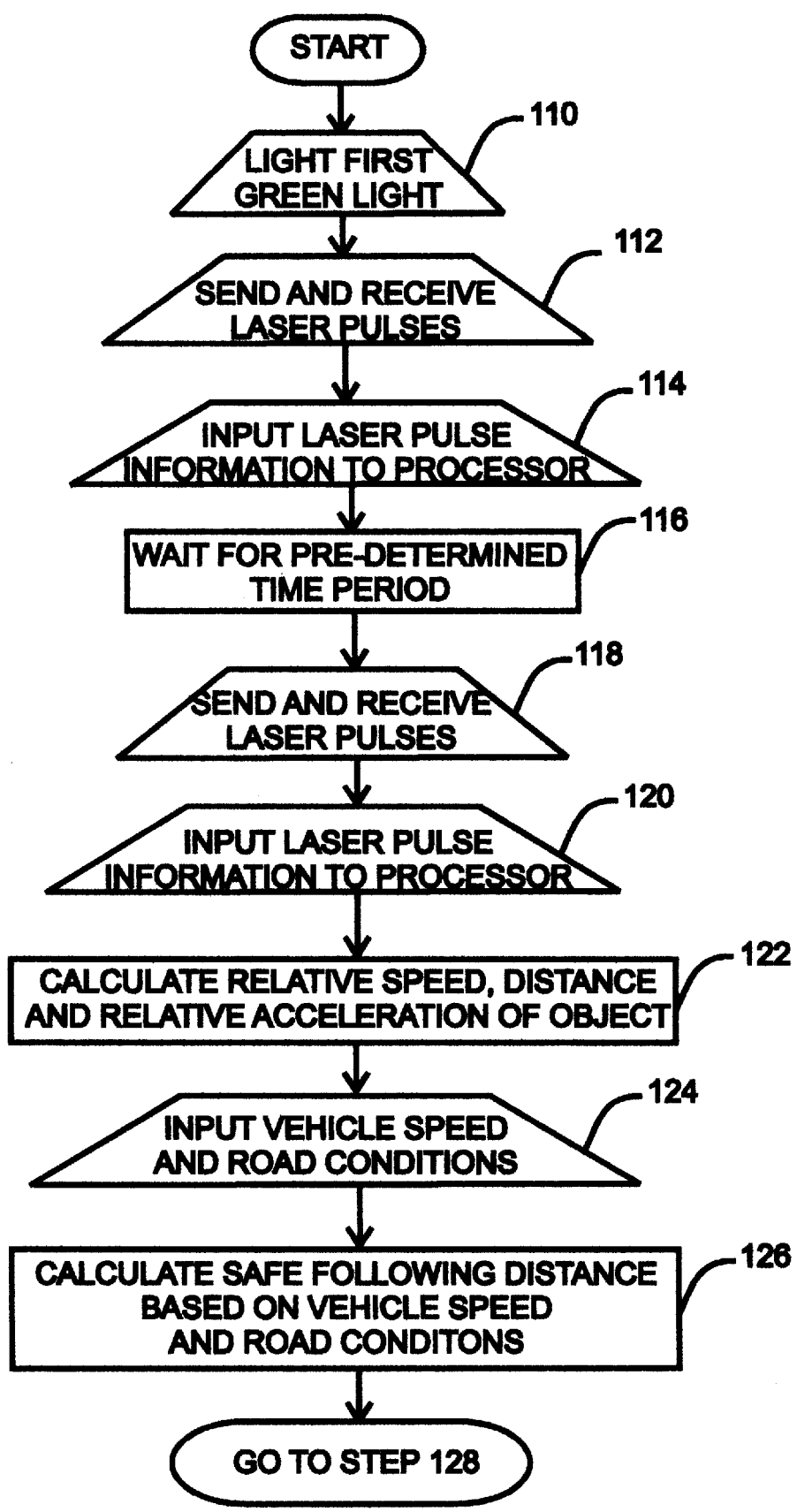
FIG. 4 is a flow chart illustrating the method of operation of the driver alert system.
Figure 5:
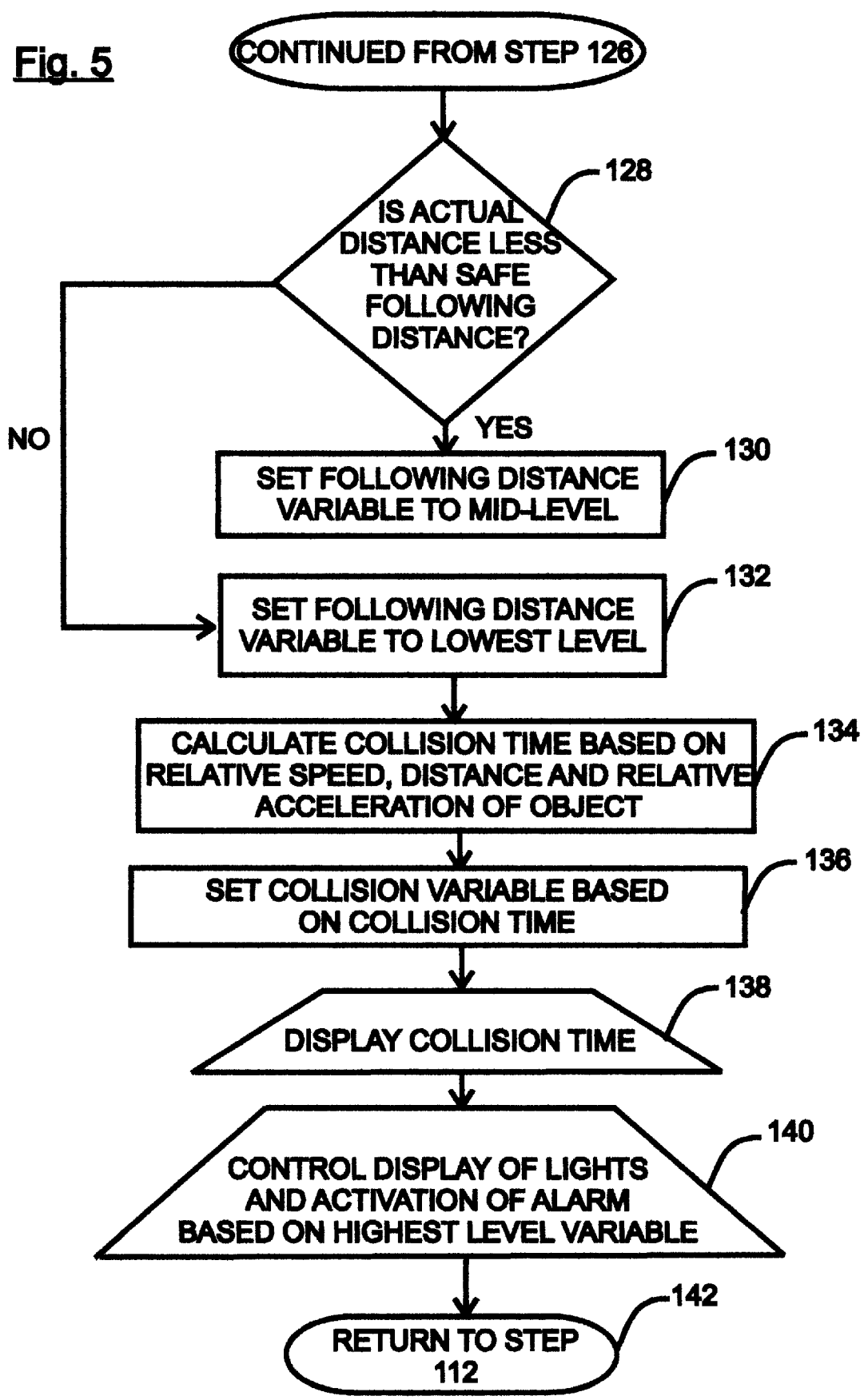
FIG. 5 is a continuation of the flow chart of FIG. 4.

FIGS. 4 and 5 are a flow chart illustrating the method of operation of the driver alert system 8. The process described herein is for a laser system; however, it may be easily adapted to a radar system within the scope of the present invention.

When the driver alert system 8 is turned on by the on switch 30, the first of the green lamps 18A in the linear display 20 is illuminated in step 110. In step 112, the laser transmitter 12A sends laser pulses, and the laser receiver 12B receives the reflection of the pulses off of an object (not shown) in front of the vehicle 10. In step 114, the laser pulse information is input to the processing unit 38A. In step 116, the system 8 waits for a pre-determined time period, then sends and receives additional laser pulses in step 118. In step 120, the latest laser pulse information is input to the processing unit 38A.

In step 122, based on the laser pulse information received, the processing unit 38A calculates the speed and acceleration of the object (not shown) in front of the vehicle 10, relative to the vehicle 10. Also in step 122, the processing unit 38A calculates the distance from the object (not shown) to the vehicle 10.

In step 124, the speed of the vehicle 10 received from the vehicle speedometer system 44 by the speed sensor 40 is input to the processing unit 38A. Also in step 124, the processing unit 38A checks the status of the road condition switches 32, and inputs the road conditions to the processing unit 38A.

In step 126 the processing unit 38A calculates a safe following distance based on vehicle speed and road conditions. The concept of safe following distance is well known in the prior art. A vehicle is following another vehicle at a safe following distance when the driver of the following vehicle can react, brake and stop before hitting the followed vehicle when the followed vehicle brakes and comes to a sudden stop. A common calculation for safe following distance is one car length per 10 miles per hour of vehicle speed. Slick road conditions reduce the safe following distance.

In step 128 (FIG. 5), the processing unit 38A compares the actual distance between the vehicle 10 and the object (not shown) to the calculated safe following distance. If the actual distance is less than the safe following distance, the processing unit 38A sets a following distance variable to mid-level in step 130.

If the actual distance is not less than the safe following distance, the processing unit 38A sets the following distance variable to the lowest level in step 132.

In step 134, the processing unit 38A calculates collision time between the vehicle 10 and the object (not shown) in front of the vehicle 10, based on the relative speed of the object, distance from the object to the vehicle 10, and the relative acceleration of the vehicle 10. This calculation is unique compared to the prior art, which calculates collision time based on relative speed, but fails to account for relative acceleration. In the prior art, if the followed object, such as a another vehicle, rapidly brakes and decelerates, the calculated collision time based only on speed and distance will be inaccurate at first, and will only be accurate a split second before the actual collision, and will of course then be of no value to the driver of the following vehicle. Calculation of collision time based on relative acceleration, distance and relative speed would be a simple matter of applied calculus, and so would be easily accomplished by one skilled in the art.

In step 136, the processing unit 38A sets a collision variable based on the collision time calculated in the previous step.

In step 138, the calculated collision time is displayed on the collision time display 34.

In step 140, display of the lamps 18A, 18B, 18C, 18D and the audio alarm through the speaker 22 is controlled based on the following distance variable (see steps 130, 132) or the collision variable (see step 136), whichever of the two variables is set to the highest alarm level (reflecting the most urgent alarm condition). As an example, if the actual following distance is not less than the calculated safe following distance, the following distance variable is set to the lowest level (step 132). Continuing with the example, if the collision time is very small, such as 5 seconds or less, the collision time variable will be set to a very high level (step 136). In this case, the display of the lamps 18A, 18B, 18C, 18D and the audio alarm through the speaker 22 is based on the collision time variable, because it represents the most urgent alarm condition.

As another example, assume the vehicle 10 is following another vehicle (not shown) at the same speed as the other vehicle. In this case, the speed and the acceleration of the followed vehicle are zero, relative to the vehicle 10. The collision time variable will be set to the lowest level in this case. Continuing with this example, assume the vehicle 10 is following the other vehicle very closely, such that the actual distance between the vehicles is less than the safe following distance. In this case, the following distance variable will be set to mid-level (step 130). In this case, the display of the lamps 18A, 18B, 18C, 18D and the audio alarm through the speaker 22 is based on the following distance variable, because it represents the most urgent alarm condition.

The display of the lamps 18A, 18B, 18C, 18D is graduated based on the urgency of the alarm condition. For example, when the system 8 is first turned on, only the first green light 18A is illuminated, indicating a safe condition. As the level of the alarm becomes more urgent, the number of lamps 18A, 18B, 18C, 18D illuminated increases toward the last red lamp 18C of the linear display 20. At the most urgent condition, the urgent lamp 18D illuminates and the audible siren sounds through the speaker 22.

After the display is updated in step 140, control returns through step 142 to step 112, in which the laser transmitter 12A sends laser pulses and the reflection of the pulses is received by the laser receiver 12B.

Thus the driver alert system 8 of the present invention provides a display and alarm to the driver based on the most urgent condition created by unsafe following distance or impending collision, and displays and calculates the impending collision time using a superior method which includes relative acceleration in the calculation.

The foregoing description is included to describe embodiments of the present invention which include the preferred embodiment, and is not meant to limit the scope of the invention; for example, the lamps 18A, 18B, 18C, 18D could be of a different number and arrangement. From the foregoing description, many variations will be apparent to those skilled in the art that would be encompassed by the spirit and scope of the invention. The scope of the invention is to be limited only by the following claims and their legal equivalents.

The invention claimed is:

1. A driver alert system for installation in a vehicle, the system comprising:
   a. a transmission means for transmitting a signal to an object;
   b. a reception means for receiving the signal transmitted by the transmission means, after the signal is reflected from the object;
   c. a first control and driving means configured to control and drive the transmission means and the reception means;
   d. a processing means comprising a processing unit and a memory unit, the processing means configured to receive data from the reception means regarding time durations between transmission and reception of multiple ones of the signals;
   e. the processing means configured to calculate a relative speed of the object with respect to the vehicle, a distance from the object to the vehicle, and a relative acceleration of the object with respect to the vehicle, based on time durations between transmission and reception of multiple ones of the signals;
   f. the processing means further configured to calculate a collision time as a function of the relative speed of the object, the distance from the object to the vehicle, and the relative acceleration of the object, and to establish an output signal based on the collision time;
   g. a collision time display;
   h. an output device;
   i. an output control and driving means configured to display the collision time on the collision time display, and to control the operation of the output device based on the output signal received from the processing means;
   j. the processing means further configured to transmit collision time data to the output control and driving means, and to transmit the output signal to the output control and driving means.

2. The system of claim 1, wherein the transmission means is a laser transmitter configured to transmit a laser beam at the object, and the reception means is a receiver configured to receive a reflection of the laser beam.

3. The system of claim 2, wherein the output device comprises at least one lamp.

4. The system of claim 1, wherein the output device comprises at least one lamp.

5. A driver alert system for installation in a vehicle, the system comprising:
   a. a transmission means for transmitting a signal to an object;
   b. a reception means for receiving the signal transmitted by the transmission means, after the signal is reflected from the object;
   c. a first control and driving means configured to control and drive the transmission means and the reception means;
   d. at least one road condition switch;
   e. a speed sensor configured to connect to a vehicle speedometer system and to receive vehicle speed information from the vehicle speedometer system;

f. a processing means comprising a processing unit and a memory unit, the processing means configured to receive reception data from the reception means regarding time durations between transmission and reception of multiple ones of the signals and road condition data from the road condition switch, and the vehicle speed information from the speed sensor;

g. the processing means configured to calculate a relative speed of the object with respect to the vehicle, a distance from the object to the vehicle, and a relative acceleration of the object with respect to the vehicle, based on time durations between transmission and reception of multiple ones of the signals;

h. the processing means further configured to calculate a safe following distance based on the road condition data and the vehicle speed information and to establish a comparison between the safe following distance and the distance from the object to the vehicle and to set a first alarm level based on the comparison;

i. the processing means further configured to calculate a collision time as a function of the relative speed of the object, the distance from the object to the vehicle, and the relative acceleration of the object, and to set a second alarm level based on the collision time;

j. a collision time display;

k. an output device;

l. an output control and driving means configured to display the collision time on the collision time display, and to control the operation of the output device based on an output signal received from the processing means;

m. the processing means further configured to transmit collision time data to the output control and driving means, to determine which of the first alarm level and the second alarm level has a greater value, to establish the output signal based on the greater of the first alarm level and the second alarm level, and to transmit the output signal to the output control and driving means.

6. The system of claim 5, wherein the transmission means is a laser transmitter configured to transmit a laser beam at the object, and the reception means is a receiver configured to receive a reflection of the laser beam.

7. The system of claim 6, wherein the output device comprises at least one lamp.

8. The system of claim 5, wherein the output device comprises at least one lamp.

9. A process for alerting a driver of a vehicle comprising the steps of:

a. transmitting multiple laser beams at an object;

b. receiving reflections of the laser beams;

c. determining a speed of the vehicle;

d. calculating a relative speed of the object with respect to the vehicle, a distance from the object to the vehicle, and a relative acceleration of the object with respect to the vehicle, based on time durations between transmissions and receptions of the reflections of the multiple laser beams;

e. calculating a safe following distance based on road conditions and the speed of the vehicle, and establishing a comparison between the safe following distance and the distance from the object to the vehicle and setting a first alarm level based on the comparison;

f. calculating a collision time as a function of the relative speed of the object, the distance from the object to the vehicle, and the relative acceleration of the object, and setting a second alarm level based on the collision time;

g. displaying the collision time on a collision time display;

h. determining which of the first alarm level and the second alarm level has a greater value; and i. providing an output on an output device based on the greater of the first alarm level and the second alarm level.

* * * * *